United States Patent
Iwakiri

(10) Patent No.: US 7,483,066 B2
(45) Date of Patent: Jan. 27, 2009

(54) IMAGE PROCESSING METHOD AND APPARATUS

(75) Inventor: Naoto Iwakiri, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 670 days.

(21) Appl. No.: 11/015,029

(22) Filed: Dec. 20, 2004

(65) Prior Publication Data

US 2005/0134701 A1 Jun. 23, 2005

(30) Foreign Application Priority Data

Dec. 18, 2003 (JP) ............................. 2003/420355

(51) Int. Cl.
*H04N 3/14* (2006.01)
(52) U.S. Cl. ..................................... 348/294
(58) Field of Classification Search ................. 348/294, 348/300, 301, 223.1
See application file for complete search history.

(56) References Cited

U.S. PATENT DOCUMENTS

| 4,857,723 A | | 8/1989 | Modiestte |
| 5,103,298 A | * | 4/1992 | Kashimura et al. .......... 348/572 |
| 5,331,179 A | | 7/1994 | Lee et al. |
| 6,654,054 B1 | * | 11/2003 | Embler ........................ 348/241 |
| 2004/0246858 A1 | * | 12/2004 | Saigusa et al. ........... 369/53.31 |

FOREIGN PATENT DOCUMENTS

| JP | 06-098167 | 4/1994 |
| JP | 2002-016495 A | 1/2002 |

OTHER PUBLICATIONS

Partial translation of Office Action in JP 2003-420355.

* cited by examiner

*Primary Examiner*—Tuan Ho
*Assistant Examiner*—Akshay Trehan
(74) *Attorney, Agent, or Firm*—Sughrue Mion, PLLC

(57) ABSTRACT

Image information is obtained from a solid-state detector as an analog image signal. The analog image signal is converted into a digital image signal by performing A/D conversion. Then, a conversion error, which is included in the digital image signal, is removed by using a correction table, and logarithmic transformation is performed on the digital image signal, from which the conversion error has been removed.

3 Claims, 4 Drawing Sheets

| ANALOG IMAGE SIGNAL | 0 | 0.875 | 2.0625 | 3.25 | 4.1875 | · · · |
|---|---|---|---|---|---|---|
| DIGITAL IMAGE SIGNAL AFTER A/D CONVERSION | 0 | 1 | 2 | 3 | 4 | · · · |
| CORRECTION VALUE | 0 | -0.125 | 0.0625 | 0.25 | 0.1875 | · · · |
| CORRECTION DIGITAL VALUE | 0 | -2 | 1 | 4 | 3 | · · · |
| OUTPUT DIGITAL VALUE (PSEUDO 4-BIT ADDITION) | 0 | 14 | 33 | 52 | 67 | · · · |

CORRECTION TABLE RT

IMAGE PROCESSING METHOD AND APPARATUS

BACKGROUND OF THE INVENTION

1. Field of the Invention

The present invention relates to an image processing method and apparatus for correcting an image signal, which is obtained from a solid-state detector.

2. Description of the Related Art

In a medical radiological imaging device or the like, a radiological solid-state detector having a photoconductive layer such as a selenium plate, which is sensitive to radiation such as X-rays, is used as an image detector so that a radiation dose received by a subject is reduced and the diagnostic performance of the device is improved, for example. The radiological solid-state detector is irradiated with radiation, and an electric charge corresponding to the irradiated radiation dose is accumulated as a latent image charge in a charge accumulating portion within the radiological solid-state detector. Accordingly, radiological image information is recorded in the charge accumulating portion as an electrostatic latent image. The radiological image information is also read out from the solid-state detector by scanning the radiological solid-state detector, in which the radiological image information is recorded, by read-out light, which is either beam-shaped or line-shaped. Accordingly, the radiological image information is read out from the solid-state detector. The method as described above is already disclosed (U.S. Pat. Nos. 5,331,179 and 4,857,723).

In the method as described above, the image information obtained from the solid-state detector represents the amount of an electric charge, which is accumulated in the solid-state detector. Since the image information is an analog image signal, the image information needs to be digitized (A/D conversion) to perform image processing or the like on the obtained image. As methods for digitizing analog image signals, there are a method using linear quantization and a method using non-linear quantization. The non-linear quantization is effective in reducing a S/N ratio in a low signal level region. Therefore, when the analog image signal is converted into a digital image signal, the non-linear quantization by using logarithmic transformation (logarithmic compression) is performed.

As methods for performing the non-linear quantization as described above, there are a method for performing logarithmic transformation after performing A/D conversion on an analog image signal, and a method for performing A/D conversion after performing logarithmic transformation on an analog image signal by using a logarithmic amplifier. In the former method, there is a problem that a conversion error generated during the A/D conversion is amplified when the logarithmic transformation is performed. Since the error is amplified, the resolution deteriorates, and granularity increases in a low density region, which is represented by the image signal. Therefore, a higher bit A/D converter or, if the bit number is the same, an expensive A/D converter, of which conversion error is small, is required to reduce the quantization error. Hence, there is a problem that the cost becomes high.

In the latter method, since the A/D conversion is performed after performing the logarithmic transformation, the conversion error is not amplified. However, since the logarithmic amplifier is required, there is a problem that the cost becomes high.

SUMMARY OF THE INVENTION

In view of the foregoing circumstances, it is an object of the present invention to provide a low-cost image processing apparatus, which can remove a linearity error caused by the A/D conversion, thereby preventing the deterioration of the image quality.

An image processing method according to the present invention is an image processing method for obtaining image information, as an image signal for each pixel, from a solid-state detector, in which the image information is recorded as an electrostatic latent image, the method comprising the steps of:

obtaining the image information from the solid-state detector as an analog image signal;

performing A/D conversion to convert the obtained analog image signal into a digital image signal;

removing a conversion error, included in the digital image signal, by using a correction table, which stores correction conditions for removing the conversion error generated in the digital image signal when the A/D conversion is performed; and generating a logarithmic image signal by performing logarithmic transformation on the digital image signal, from which the conversion error has been removed.

An image processing apparatus according to the present invention is an image processing apparatus for obtaining image information, as an image signal for each pixel, from a solid-state detector, in which the image information is recorded as an electrostatic latent image, the apparatus comprising:

a signal obtainment unit for obtaining the image information from the solid-state detector as an analog image signal;

an A/D conversion unit for performing A/D conversion to convert the analog image signal, which is obtained by the signal obtainment unit, into a digital image signal;

a correction table for storing correction conditions for removing a conversion error, included in the digital image signal, into which the analog image signal has been converted by the A/D conversion unit;

a signal correction unit for removing the conversion error, included in the digital image signal, into which the analog image signal has been converted by the A/D conversion unit, by using the correction table; and a logarithmic transformation unit for generating a logarithmic image signal by performing logarithmic transformation on the digital image signal, which has been corrected by the signal correction unit.

Here, the correction conditions should be set so that the conversion error can be removed from the digital image signal after A/D conversion. The correction conditions may be set by defining the signal value of the digital image signal after the conversion error has been removed. Alternatively, the correction conditions may be set by defining the value of the conversion error, which should be removed.

The correction table may store the correction conditions only for a digital image signal, of which resolution attained by performing logarithmic transformation on the digital image signal at the logarithmic transformation unit is higher than its resolution attained by performing logarithmic transformation on an analog image signal using a logarithmic amplifier and performing A/D conversion after the logarithmic transformation.

According to the image processing method and apparatus of the present invention, a conversion error, which is generated in a digital image signal when an analog image signal is converted into the digital image signal, is removed from the digital image signal. After the conversion error is removed, logarithmic transformation is performed on the digital image signal to generate a logarithmic image signal. Therefore, a linearity error included in the digital image signal is not amplified when the logarithmic transformation is performed. Further, the conversion error can be removed without increasing the quantization bit number of the A/D conversion unit itself. Accordingly, deterioration of the image quality can be prevented by configuring the image processing apparatus at a low cost.

Alternatively, the correction conditions may be set only for a digital image signal, of which resolution attained by performing logarithmic transformation on the digital image signal at the logarithmic transformation unit is higher than its resolution attained by performing logarithmic transformation on an analog image signal using a logarithmic amplifier and performing A/D conversion after the logarithmic transformation. Therefore, only the digital image signal, of which resolution attained at the A/D conversion unit is low, is corrected. Accordingly, an operation amount can be efficiently reduced.

DESCRIPTION OF THE PREFERRED EMBODIMENTS

Figure 1:
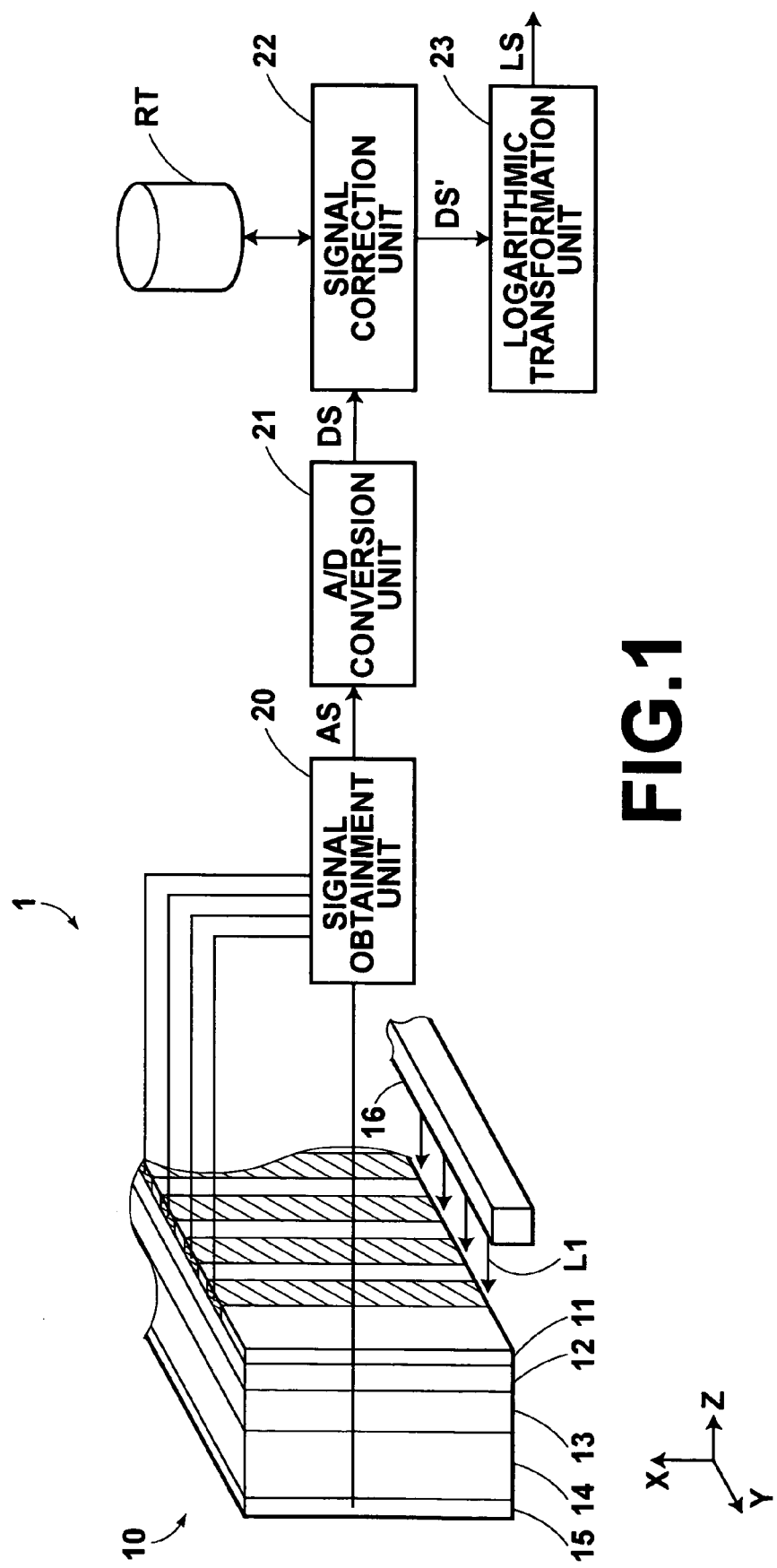
FIG. 1 is a structural diagram illustrating a preferred embodiment of an image processing apparatus according to the present invention.

Hereinafter, an embodiment of an image processing apparatus according to the present invention will be described in detail, with reference to the attached drawings. FIG. 1 is a structural diagram illustrating a preferred embodiment of the image processing apparatus according to the present invention. An image processing apparatus 1, which is illustrated in FIG. 1, obtains image information from a solid state detector. The solid state detector is irradiated with an electromagnetic wave for recording, which includes the image information. Accordingly, the image processing apparatus 1 obtains the image information from the solid-state detector, in which the image information is recorded as an electrostatic latent image. The image processing apparatus 1 obtains the image information, which is recorded in the solid-state detector, as an image signal for each pixel.

First, a solid-state detector 10 will be described with reference to FIG. 1. The solid-state detector 10 is a solid-state detector by using a "photo-readout" method, as disclosed in Japanese Unexamined Patent Publication No. 2000-284056. The solid-state detector 10 includes a first electrode 11, a photo-conductive layer 12 for readout, an electric charge transfer layer 13, a photo-conductive layer 14 for recording, and a second electrode 15.

The first electrode 11 is made of a NESA film (a tin oxide film), or the like. The first electrode 11 includes a plurality of linear electrodes, which extend toward a scanning direction (the direction of an arrow X), and which are substantially parallel with each other. Each of the linear electrodes in the first electrode 11 is electrically insulated from each other. The photo-conductive layer 12 for readout is made of amorphous selenium, for example. When the photo-conductive layer 12 for readout is irradiated with read-out light L1, the photo-conductive layer 12 for readout becomes conductive, and pairs of electric charges are generated. The electric charge transfer layer 13 is layered on the photoconductive layer 12 for readout. The electric charge transfer layer 13 acts substantially as an insulator for a negative charge. The electric charge transfer layer 13 acts substantially as a conductor for a positive charge. The photo-conductive layer 14 for recording is made of amorphous selenium, for example. When the photo-conductive layer 14 for recording is irradiated with an electromagnetic wave (light or radiation) for recording, the photo-conductive layer 14 for recording becomes conductive, and a pair of electric charges is generated. Further, the second electrode 15 is layered on the photoconductive layer 14 for recording. The second electrode 15 is made of an ITO (Indium Tin Oxide) film or the like, which transmits the irradiated electromagnetic wave for recording.

Here, a charge accumulating portion 19 is formed at an interface between the electric charge transfer layer 13 and the photo-conductive layer 14 for recording. When an electron, which is generated in the photo-conductive layer 14 for recording, tries to move toward the first electrode 11 by an electric field generated between the first electrode 11 and the second electrode 15, the movement of the electron is restricted by the electric charge transfer layer 13. Therefore, an electric charge corresponding to the irradiation amount of the electromagnetic wave for recording is accumulated as an electrostatic latent image in the charge accumulating portion 19. Accordingly, the image information is recorded in the charge accumulating portion 19.

Here, when recording the image information in the solid-state detector 10, a signal obtainment unit 20 applies a high voltage between the first electrode 11 and the second electrode 15. Thereby, the first electrode 11 is negatively charged, and the second electrode 15 is positively charged. Next, when an electromagnetic wave for recording is irradiated from the side of the second electrode 15, pairs of positive/negative electric charges corresponding to the irradiation amount of the electromagnetic wave for recording are generated in the photo-conductive layer 14 for recording. Then, positive holes from among the pairs of electric charges move toward the second electrode 15, and the positive holes are combined with the negative charges of the second electrode 15. Accordingly, the positive holes disappear. Meanwhile, electrons from among the pairs of electric charges move toward the first electrode 11. However, the movement of the electrons is restricted by the electric charge transfer layer 13. Accordingly, the image information is recorded in the charge accumulating portion 19 as an electrostatic latent image.

When reading out the image information recorded in the charge accumulating portion 19, a read-out light irradiation unit 16 irradiates the solid-state detector 10 with line-shaped read-out light L1, which extends in the direction of an arrow Y, from the side of the first electrode 11 by scanning in the direction of the arrow X. Then, pairs of electric charges corresponding to the irradiation amount of the read-out light L1 are generated at the photo-conductive layer 12 for readout. Positive holes from among the pairs of electric charges are generated and transmitted through the electric charge transfer layer 13. The positive holes are combined with the negative charges, which are accumulated in the charge accumulating portion 19. Meanwhile, the electrons from among the pairs of electric charges move toward the first electrode 11, and combine with the positive electric charges. When the positive holes and the negative electric charges are combined at the first electrode 11, electric current flows into the signal obtainment unit 20. The image information is read out by detecting the change in the electric current at the signal obtainment unit 20.

Next, the image processing apparatus 1 will be described with reference to FIG. 1. The image processing apparatus 1 includes the signal obtainment unit 20 for obtaining the image information from the solid-state detector 10 as an analog image signal AS. The image processing apparatus 1 also includes an A/D conversion unit 21 for converting the obtained analog image signal AS into a digital image signal DS by performing A/D conversion. The image processing apparatus 1 also includes a correction table RT, which stores correction conditions for removing a conversion error generated at the A/D conversion unit 21. The image processing apparatus 1 also includes a signal correction unit 22 for removing the conversion error from the digital image signal DS by using the correction table RT and outputting a digital image signal after correction. The image processing apparatus 1 also includes a logarithmic transformation unit 23 for performing logarithmic transformation on the digital image signal DS' after the correction and generating a logarithmic image signal LS. Accordingly, after the A/D conversion unit 21 performs A/D conversion on the image information, which is recorded in the solid-state detector 10, the logarithmic transformation unit 23 performs logarithmic transformation on the digital image signal, and outputs the image information as a logarithmic image signal LS. In this manner, non-linear quantization is performed on the image.

Here, when the A/D conversion unit 21 converts the analog image signal AS into a digital image signal DS, a conversion error is generated. The conversion error is mainly caused by linearity errors including a differential linearity error and an integral linearity error. The differential linearity error is a difference between an ideal quantization width and an actual value. The integral linearity error is a deviation, which occurs when the differential linearity error is accumulated.

Figure 2:
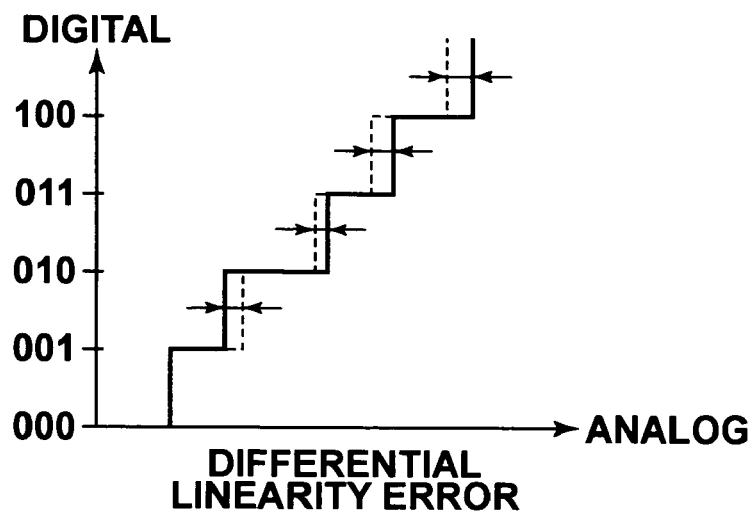
FIG. 2 is a graph illustrating an example of a differential linearity error at an A/D conversion unit.

FIG. 2 is a graph illustrating an example of a differential linearity error. Specifically, in FIG. 2, it is ideal that a digital output increases in increments of 1 LSB each time when an analog signal increases by a constant amount. However, in actual cases, the digital output increases by 1 LSB either before or after the analog image value reaches a value, at which value the digital output will increase by 1 LSB in an ideal state. This error is the differential linearity error.

Figure 3:
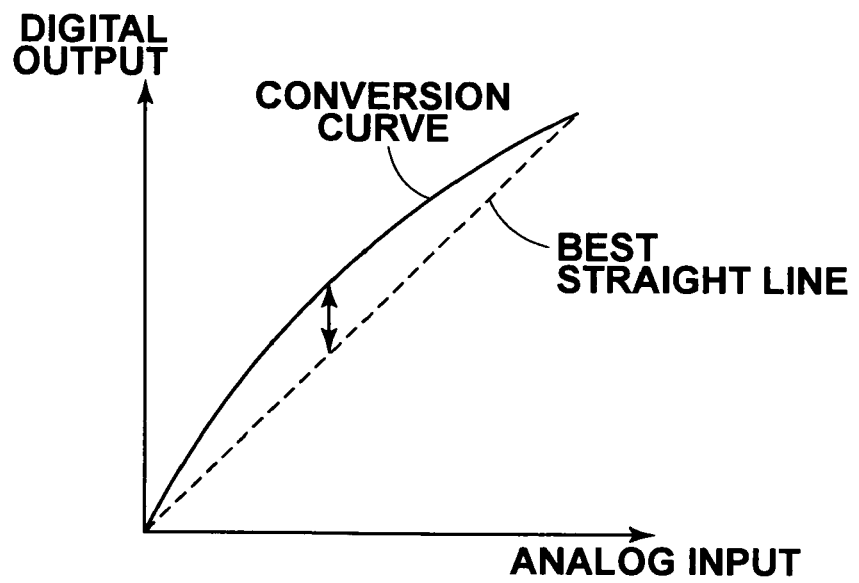
FIG. 3 is a graph illustrating an example of an integral linearity error at the A/D conversion unit.

FIG. 3 is a graph illustrating an example of an integral linearity error. In FIG. 3, a straight line between zero and full scale is an ideal straight line in the A/D conversion. However, when actual output from the A/D conversion unit is plotted in the graph, the line is not a straight line but a curve as illustrated in FIG. 3. The difference between the ideal straight line and an input-output curve is the integral linearity error.

When logarithmic transformation is performed on the digital image signal DS, which includes the conversion error as described above, a conversion error δ before the logarithmic transformation becomes log δ after the logarithmic transformation. Therefore, the conversion error is amplified or attenuated. Especially, when the signal value of the analog image signal AS is small, the conversion error is remarkably amplified, and the influence of the error becomes large. Therefore, the resolution drops, and the granularity becomes coarser.

Therefore, the image processing apparatus 1, which is illustrated in FIG. 1, includes the correction table RT, which stores correction conditions for removing the conversion error, and the signal correction unit 22 for removing the conversion error from the digital image signal by using the correction table RT and outputting a digital image signal after the conversion error is removed. The signal correction unit 22 removes the conversion error, by using the correction table RT, from the digital image signal, which was converted from an analog image signal. Then, the logarithmic transformation unit 23 performs logarithmic transformation on the digital image signal.

Figures 4, 5:
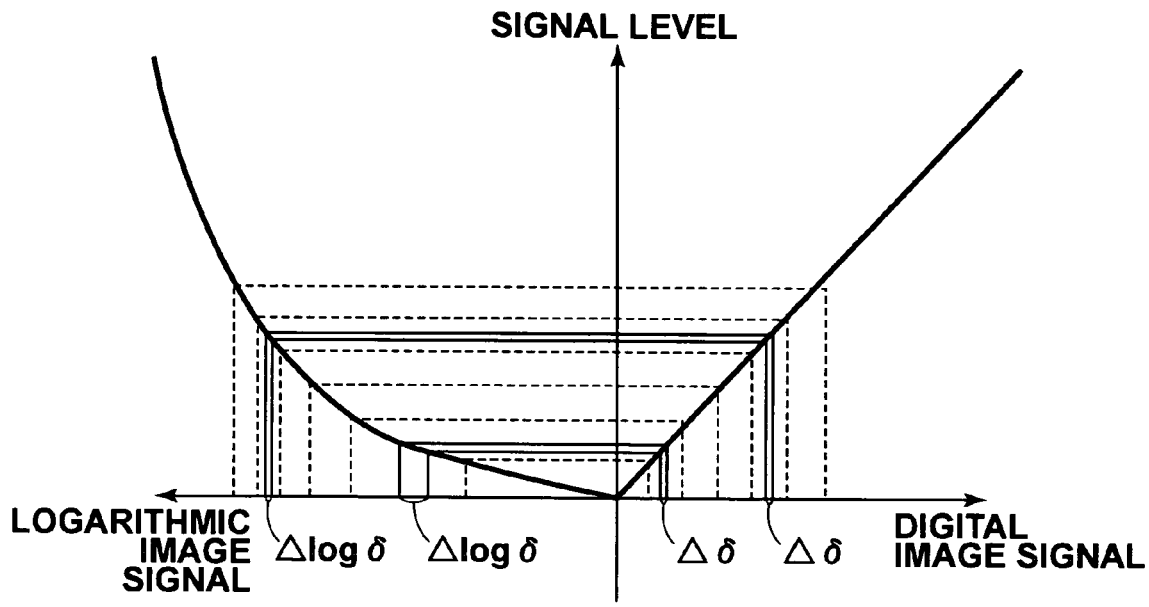
FIG. 4 is a graph illustrating the state in which logarithmic transformation is performed on digital image signals at the image processing apparatus according to the present invention.
FIG. 5 is a diagram illustrating an example of a correction table in the image processing apparatus according to the present invention.

Here, as illustrated in FIG. 5, the correction table RT stores correction amounts in advance, based on the result of studying an inherent linearity error in the conversion according to the type of the A/D conversion unit 21. The signal correction unit 22 uses the correction table RT, and corrects the signal value of the input digital image signal DS by the correction amount, which corresponds to the signal value of the input digital image signal DS. The signal correction unit 22 outputs a digital image signal DS' after correction, to the logarithmic transformation unit 23. At this time, a digital correction value may be represented as digital data by adding pseudo 4 bits to the number of bits of the A/D converter, which has read out the analog image signal, as illustrated in FIG. 5. For example, when the A/D converter, which has read out the analog image signal, is a 12 bit A/D converter, the 12 bit data from the A/D converter is processed as 16 bit data by adding pseudo 4 bits to the 12 bit data to represent the digital correction value. Alternatively, the correction table RT may also function as a logarithmic transformation unit, which performs logarithmic transformation on the digital image signal and generates a logarithmic image signal. In this case, even if the input digital image data is represented by 12 bits, the digital value after the logarithmic transformation may be output as the digital value after correction.

At this time, the correction table RT may be set for the entire signal range of the digital image signal DS. Alternatively, the correction table RT may be set only for a digital image signal DS in a certain signal range, of which resolution attained by performing logarithmic transformation on the digital image signal DS is higher than its resolution attained by performing logarithmic transformation on the analog image signal AS and performing A/D conversion on the analog image signal after the logarithmic transformation.

Specifically, in the image processing apparatus illustrated in FIG. 1, a method for performing logarithmic transformation after converting an analog image signal AS into a digital image signal DS is used. There is also a method for obtaining a digital signal by performing logarithmic transformation on an analog image signal AS by using a logarithmic amplifier and performing A/D conversion on the analog image signal AS, on which logarithmic transformation has been performed. When these two methods are compared with each other, resolution (quantization interval) attained at the A/D conversion unit 21 differs depending on the magnitude of the analog image signal AS. Therefore, for the digital image signal DS, of which the signal value is equal to or less than a signal threshold value DSref, the conversion error is removed by setting the correction table RT. For the digital image signal DS, of which the signal value is higher than the signal threshold value DSref, the conversion error is not removed. Accordingly, the correction processing is performed only on the digital image signal DS, which is largely influenced by the conversion error. Therefore, the operation amount can be efficiently reduced while the deterioration of the image quality is prevented.

The signal threshold value DSref is determined as described below. For example, it is assumed that the input range of the A/D conversion unit 21 is a four-digit range of 0.01 mR to 100 mR. It is also assumed that when a logarithmic amplifier is used, the bit number of the A/D conversion unit is A. It is also assumed that when the logarithmic transformation unit 23 is used, the bit number of the A/D conversion unit 21 is B. In this case, when the logarithmic amplifier is used, the difference from 0.01 mR to the next value is $0.01 \times (10^{1/2(A-2)}-1)$. When the logarithmic transformation unit 23 is used, the difference is $100/2^B$.

The signal threshold value DSref is a value, at which the resolution attained by performing logarithmic transformation on the digital image signal DS exceeds the resolution attained by performing logarithmic transformation on an analog image signal and performing A/D conversion on the analog image signal AS after the logarithmic transformation. The signal threshold value DSref maybe represented by using the following equation:

$$10^{DSref} \geq 2^{(A-2)} \log(10^4/(2^B \times (10^{1/2(A-2)}-1)))$$

Here, it is assumed that A=12 bits and B=16 bits. If 12 is substituted for A and 16 is substituted for B in the above equation, the following result is obtained:

$$DSref \geq 0.679 \text{ mR}.$$

Specifically, if DSref≧0.679 mR, the resolution attained by performing logarithmic transformation on the digital image signal DS is higher than the resolution attained by performing logarithmic transformation using a logarithmic amplifier. Hence, the quantization error is small. Therefore, the correction table RT is created only for the digital image signal DS, of which the signal value is less than the signal threshold value DSref. Accordingly, the correction processing is performed only for the digital image signal DS, which is largely influenced by the conversion error. Consequently, the deterioration of the image quality can be prevented, and the operation amount can be efficiently reduced.

Figure 6:
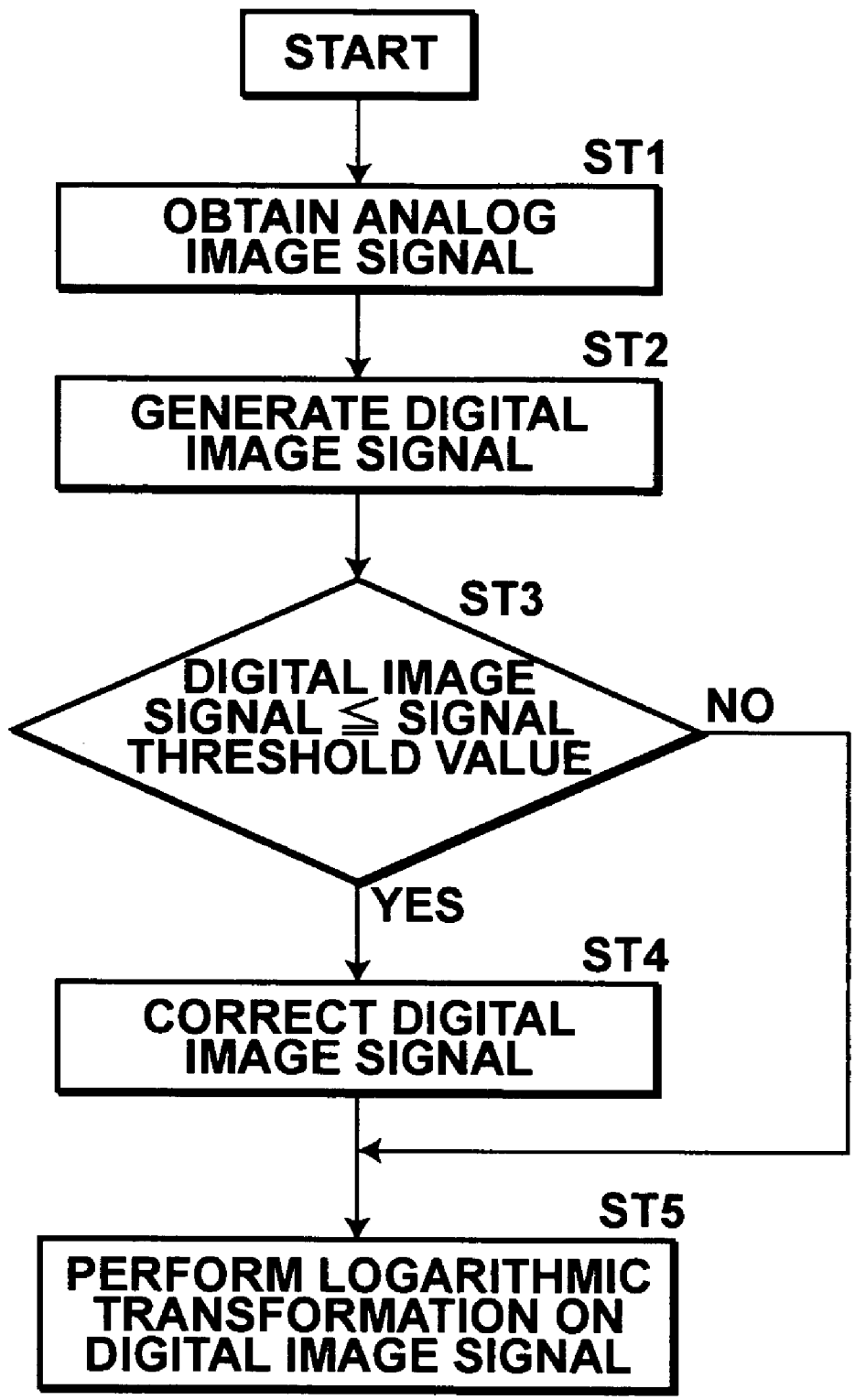
FIG. 6 is a flow chart illustrating a preferred embodiment of an image processing method according to the present invention.

FIG. 6 is a flow chart illustrating a preferred embodiment of an image processing method according to the present invention. The image processing method will be described with reference to FIGS. 1 through 6. First, the signal obtainment unit 20 obtains the image information, which is recorded in the solid-state detector 10, as an analog image signal AS (step ST1). Then, the A/D conversion unit 21 performs A/D conversion on the analog image signal AS, and a digital image signal DS is generated (step ST2).

Next, the signal correction unit 22 performs correction processing on the digital image signal DS, of which the signal level is less than the signal threshold value DSref, among the digital image signals DS (step ST3). Specifically, a conversion error is removed, based on the correction table RT, from the digital image signal DS, of which the signal value is less than the signal threshold value DSref (step ST4). Then, the digital image signal DS is sent from the signal correction unit 22 to the logarithmic transformation unit 23. The logarithmic transformation unit 23 performs logarithmic transformation on the digital image signal DS, and a logarithmic image signal LS is output (step ST5).

According the embodiment as described above, when the analog image signal AS is converted into the digital image signal DS and logarithmic transformation is performed on the digital image signal DS, the deterioration of the image quality, caused by the conversion error in the A/D conversion, can be prevented. Especially, since the correction processing is performed only for the digital image signal DS, of which signal level is low, the operation amount can be efficiently reduced.

The present invention is not limited to the embodiment described above. For example, in FIG. 1, the solid-state detector 10 is a "photo-readout" type. Alternatively, an electrode may have a TFT (thin film transistor) structure. Further, the solid-state detector 10 as illustrated above is a direct conversion type. However, the solid-state detector 10 may have a structure of an "indirect conversion" type, in which an image is obtained by using a read-out circuit such as the TFT after an X-ray is converted into light by using phosphors or the like.

What is claimed is:

1. An image processing method for obtaining image information, as an image signal for each pixel, from a solid-state detector, in which the image information is recorded as an electrostatic latent image, the method comprising the steps of:
    obtaining the image information from the solid-state detector as an analog image signal;
    performing A/D conversion to convert the obtained analog image signal into a digital image signal;
    removing a conversion error, included in the digital image signal, by using a correction table, which stores correction conditions for removing the conversion error generated in the digital image signal when the A/D conversion is performed; and
    generating a logarithmic image signal by performing logarithmic transformation on the digital image signal, from which the conversion error has been removed,
    wherein the correction table stores the correction conditions only for the digital image signal, of which resolution attained by performing the logarithmic transformation on the digital image signal at the logarithmic transformation unit is higher than its resolution attained by performing the logarithmic transformation on the analog image signal using a logarithmic amplifier and performing A/D conversion on the analog image signal after the logarithmic transformation.

2. An image processing apparatus for obtaining image information, as an image signal for each pixel, from a solid-state detector, in which the image information is recorded as an electrostatic latent image, the apparatus comprising:
    a signal obtainment unit for obtaining the image information from the solid-state detector as an analog image signal;
    an A/D conversion unit for performing A/D conversion to convert the analog image signal, which is obtained by the signal obtainment unit, into a digital image signal;
    a correction table for storing correction conditions for removing a conversion error, included in the digital image signal, into which the analog image signal has been converted by the A/D conversion unit;
    a signal correction unit for removing the conversion error, included in the digital image signal, into which the analog image signal has been converted by the A/D conversion unit, by using the correction table; and
    a logarithmic transformation unit for generating a logarithmic image signal by performing logarithmic transformation on the digital image signal, which has been corrected by the signal correction unit,
    wherein the correction table stores the correction conditions only for the digital image signal, of which resolution attained by performing the logarithmic transformation on the digital image signal at the logarithmic transformation unit is higher than its resolution attained by performing the logarithmic transformation on the analog image signal using a logarithmic amplifier and performing A/D conversion on the analog image signal after the logarithmic transformation.

3. An image processing apparatus as defined in claim 2, wherein the correction table also functions as the logarithmic transformation unit for generating the logarithmic image signal.

* * * * *